United States Patent
Ebi et al.

(10) Patent No.: US 9,362,810 B2
(45) Date of Patent: Jun. 7, 2016

(54) LINEAR MOTOR AND METHOD FOR PRODUCING A GAS SUPPORTED RUNNER OF A LINEAR MOTOR

(71) Applicant: AeroLas GmbH, Unterhaching (DE)

(72) Inventors: Harald Ebi, Munich (DE); Michael Muth, Munich (DE)

(73) Assignee: AeroLas GmbH, Unterhaching (DE)

( * ) Notice: Subject to any disclaimer, the term of this patent is extended or adjusted under 35 U.S.C. 154(b) by 284 days.

(21) Appl. No.: 14/221,964

(22) Filed: Mar. 21, 2014

(65) Prior Publication Data

US 2015/0091394 A1    Apr. 2, 2015

(30) Foreign Application Priority Data

Mar. 21, 2013  (DE) .......................... 10 2013 102 922

(51) Int. Cl.
*H02K 41/02*    (2006.01)
*H02K 41/03*    (2006.01)
*H02K 15/03*    (2006.01)

(52) U.S. Cl.
CPC ................ *H02K 41/02* (2013.01); *H02K 15/03* (2013.01); *H02K 41/031* (2013.01); *Y10T 29/49009* (2015.01)

(58) Field of Classification Search
CPC ......... H02K 7/08; H02K 5/16; H02K 41/031; H02K 41/02
USPC ......... 310/12.01, 12.02, 13–14, 12.24, 12.31, 310/12.33
See application file for complete search history.

(56) References Cited

U.S. PATENT DOCUMENTS

| 3,376,578 | A | 4/1968 | Sawyer | |
|---|---|---|---|---|
| 4,798,985 | A | 1/1989 | Chitavat | |
| 6,271,606 | B1 * | 8/2001 | Hazelton | G03F 7/70758 250/491.1 |
| 7,919,888 | B2 * | 4/2011 | Wendorf | H02K 41/03 310/12.01 |
| 7,932,646 | B2 * | 4/2011 | Shibata | G03B 27/58 310/12.05 |
| 8,008,815 | B2 * | 8/2011 | Ro | B23Q 1/62 310/12.05 |
| 2004/0239194 | A1 | 12/2004 | Thirunarayan et al. | |

(Continued)

FOREIGN PATENT DOCUMENTS

DE    19936064 A1    2/2001
DE    10142642 A1    4/2003

*Primary Examiner* — Thanh Lam
(74) *Attorney, Agent, or Firm* — Von Rohrscheidt Patents

(57) ABSTRACT

A linear motor including a stator including electrical coils; a runner including permanent magnets; and a back iron device, wherein the runner is arranged between the stator and the back iron device and offset from the stator and the back iron device, wherein the runner is moveable relative to the stator and the back iron device; wherein the permanent magnets are arranged in a section of the runner which section is provided between the stator and the back iron device, wherein the runner is gas supported relative to the stator and/or relative to the back iron device through a gas pressure bearing, wherein the runner is provided with inner channels which are in fluid connection with a pressurized gas supply device and wherein the gas outlet nozzles are in fluid connection with an interior of the channels, wherein the gas pressure bearing includes at least a first bearing surface.

18 Claims, 3 Drawing Sheets

(56) References Cited

U.S. PATENT DOCUMENTS

| | | |
|---|---|---|
| 2006/0139615 A1 | 6/2006 | Mee et al. |
| 2007/0114854 A1 | 5/2007 | Miyamoto et al. |
| 2008/0012431 A1* | 1/2008 | Williams ............ G03F 7/70758 310/12.06 |
| 2009/0096297 A1* | 4/2009 | Kim ....................... H02K 41/03 310/12.25 |
| 2009/0152961 A1* | 6/2009 | Vaucher ............... G01D 5/2451 310/12.19 |
| 2009/0167103 A1 | 7/2009 | Jansen |
| 2009/0302693 A1* | 12/2009 | Kim ..................... H02K 41/031 310/12.31 |
| 2009/0315413 A1* | 12/2009 | Iwatani ................. G03B 27/58 310/12.26 |

\* cited by examiner ently invention relates to a linear motor with a stator
LINEAR MOTOR AND METHOD FOR PRODUCING A GAS SUPPORTED RUNNER OF A LINEAR MOTOR

RELATED APPLICATIONS

This application claims priority from and incorporates by reference German Patent Application DE 10 2013 102 922.1 filed on Mar. 21, 2013, which is incorporated in its entirety by this reference.

FIELD OF THE INVENTION

The instant invention relates to a linear motor with a stator including electrical coils, a runner including permanent magnets and a back iron device. The invention furthermore relates to a method for producing a gas supported runner of a linear motor.

BACKGROUND OF THE INVENTION

A linear motor according to the present invention is not only an electric motor whose runner moves relative to the stator on a straight path, but also an electric motor whose runner moves relative to the stator on a curved path, for example on a circular path, namely whose runner rotates about an axis, wherein the coils of the stator are arranged opposite to the permanent magnets of the runner in axial direction and not in radial direction like in a classic electric motor.

For many industrial applications it is required to perform short stroke linear movements with high acceleration and high precision. This is the case for example for so called pick and place machines when manufacturing semi conductor circuits. It is known to use linear motors for short stroke movements. High accelerations in combination with large force development are achieved in linear motors when a magnetic field of the permanent magnets is run through a back iron. Thus, in known linear motors the permanent magnets are arranged on a back iron device and the electrical coils are arranged in the runner or at the runner so that the coils with the runner move relative to the magnet arrangement arranged on the back device. In a device of this type on the one hand side the mass of the coils has to be moved along and certainly also accelerated along and furthermore it is required to transmit the electrical supply for the coils to the moveable runner of the linear motor which is performed through flexible electrical conduits for short stroke movements.

However, when particularly high accelerations have to be performed in combinations with short paths, thus with frequent acceleration direction reversals as it is the case for pick and place machines, it is often detrimental to move the mass of the coils along.

Furthermore linear motors of this type are often configured so that the runners form a yoke that laterally reaches over the magnet assembly laterally and in which the yoke pillars are supported on the back iron device or adjacent thereto. This causes a width of the linear motor which is significantly wider than a width of a permanent magnet arrangement. Since the pull force between coils and permanent magnet arrangement is arranged in a center of the yoke, the runner also has to be configured very stable in order to support bending loads caused by the bending moments caused by the magnetic force.

US 2007/011485 A1 illustrates and describes a linear actuator with moving permanent magnets. This linear actuator includes a stator on which the armature windings are arranged, a moveable slide including the permanent magnets and a back iron yoke arranged in a stationary manner on the side of the slide that is oriented away from the stator. The moveable slide has a cross section shaped as an inverted U and is supported at its lateral free ends through conventional bearings on a support rail. This lateral bearing support causes bending moments in the center section of the U which connects both arms, wherein the bending moments have to be supported through a respective material thickness.

US 2009 01 67 103 A1 illustrates and describes a permanent magnet arrangement on a rotor. The permanent magnets are arranged at on outer circumference of the rotor on a rotor element, wherein a small distance is provided in circumferential direction between the individual permanent magnets.

DE 101 42 642 A1 illustrates and describes an electric motor, in particular a linear motor in which the windings of the armature are air cooled.

DE 199 06 4 A1 illustrates and describes a secondary element for a linear motor in which permanent magnets are placed on a metal carrier plate and secured against movement thereon, wherein the entire arrangement is encased in an encasement compound. The encased element thus formed encases the permanent magnets.

US 2004/0239194 illustrates and describes a permanent magnet arrangement for a linear motor in which the permanent magnets are arranged with alternating polarity on a carrier configured as a magnetically conductive plate acting as a back iron. The plate is moveable in a linear manner along an armature that is provided with electromagnetic coils.

U.S. Pat. No. 4,798,895 A discloses a linear motor with an air supported runner, wherein the runner includes the back iron. The runner which is either configured flat or as an inverted U is supported with its free ends at the stator, wherein bending moments impact the runner in its center portion, namely where the magnetic forces are effective.

US 2006/0139615 A1 illustrates and describes a lithography device with a moveable slide which is air supported on a stator and moveable in a linear manner. The slide forming the runner is supported at the stator through air bearings, wherein the compressed air providing the bearing pressure is run through conduits in the slide to nozzles provided in the slide. The permanent magnets are integrated in the body of the slide above the conduit system for the support air. A back iron device is arranged in a stationary manner on a side of the slide that is oriented away from the stator and connected with a coil element, so that the back iron device is arranged on a side of the coils that is oriented away from the permanent magnets of the slide.

BRIEF SUMMARY OF THE INVENTION

Thus, it is the object of the present invention to provide a linear motor whose runner is configured as a very light component without sacrificing mechanical stability so that the linear motor can reach high accelerations with low energy consumption.

The object is achieved by A linear motor including a stator including electrical coils; a runner including permanent magnets; and a back iron device, wherein the runner is arranged between the stator and the back iron device and offset from the stator and the back iron device, wherein the runner is moveable relative to the stator and the back iron device; wherein the permanent magnets are arranged in a section of the runner which section is provided between the stator and the back iron device, wherein the runner is gas supported relative to the stator and/or relative to the back iron device through a gas pressure bearing, wherein the runner is provided with a plurality of inner channels which are in fluid connection with a pressurized gas supply device and wherein the gas outlet nozzles are in fluid connection with an interior of the channels, wherein the gas pressure bearing includes at least a first bearing surface provided at the runner and a second bearing surface provided at the stator and/or at the back iron device, wherein the first bearing surface provided at the runner includes a plurality of gas outlet nozzles, wherein respective adjacent permanent magnets of the runner are offset from one another and wherein a first intermediary space formed between two adjacent permanent magnets forms a channel into which the gas outlet nozzles lead.

In this linear motor the runner including the permanent magnets is arranged between the stator and the back iron and the runner is offset relative to the stator and the back iron and moveable relative thereto. The permanent magnets are provided in a section of the runner that is arranged between the stator and the back iron device. The runner is gas supported relative to the stator and/or the back iron device through a gas pressure bearing. The runner is furthermore provided with a plurality of inner channels which are in a fluid connection with a compressed gas supply, wherein gas outlet nozzles are in a fluid connection with an interior of the channels. The gas pressure bearing includes at least one first support surface provided at the runner and a second support surface provided at the stator and/or at the back iron device. The first bearing surface provided at the runner includes a plurality of gas outlet nozzles.

Thus, in the linear motor according to the invention only the runner provided with the permanent magnets is moved, wherein the coils and also the back iron device are stationary. The permanent magnets are thus not arranged directly on the back iron device but offset slightly, thus approximately by the thickness of the bearing gap between the back iron device and the runner towards the back iron device. Still, the back iron device operates in the desired manner in spite of the small distance, namely as a conductor for the magnetic field of the permanent magnets so that also the linear motor according to the invention can impart high forces in linear movement direction.

Since the runner only includes the permanent magnets and does not include the back iron device the runner is configured accordingly light and can therefore be accelerated quickly. The gas pressure bearing has the advantage that it is approximately frictionless wherein the ability of the linear motor according to the invention to achieve high accelerations is also improved. The runner represents the active bearing element from which the gas exits into the respective bearing gap to generate a gas cushion therein on which the runner can move almost without friction relative to the stator or the back iron device. The channel structure in an interior of the runner housing between and adjacent to the permanent magnets thus forms a gas distribution structure for supplying the bearing pressurization gas from the pressurized gas supply device to the respective gas outlet nozzles in the bearing surface or in the bearing surfaces. The intermediary spaces between the permanent magnets are used in this manner as gas supply channels for the bearing pressurization gas and the gas outlet nozzles are thus provided along the intermediary space, thus along opposite edges of two adjacent permanent magnets. A bearing support force generated by the bearing pressurization gas exiting from the gas outlet nozzles thus acts in direct proximity of an attracting force generated by the permanent magnets, e.g. against the back iron device. Thus, the force flow between the magnets and the bearing support force does not have to cover great distances and is conducted only on a very short path namely between the respective permanent magnet and the gas outlet nozzles provided along its edge through the support structure. As a consequence also the support structure can be configured very light since no substantial bending moments impact the support structure over the short distance covered by the force flow through the support structure.

Advantageous embodiments of the linear motor according to the invention can be derived from the dependent claims.

Advantageously the runner includes a support structure in which or at which the permanent magnets are arranged. The support structure in the linear motor according to the invention only has to fulfill the tasks of guiding and supporting the runner and the task of receiving the permanent magnets. Thus, a particularly light support structure can be selected which helps to further reduce the weight of the runner.

Thus it is advantageous when the support structure includes a closed housing in whose interior the permanent magnets are arranged. The permanent magnets are thus protected against external influences.

It is furthermore advantageous when the housing is formed by a tub shaped housing element which is closed with a cover at its open side. This tub shaped housing element can be made for example from a fiber composite material, advantageously a carbon fiber composite material and thus have particularly low mass.

The permanent magnets are advantageously provided in base of the tub shaped housing element.

The cover is advantageously made from an encasement compound that is provided with an open pore reinforcement mat, wherein the reinforcement mat is advantageously configured as a flat contexture, for example a fleece, a woven or knitted material. The reinforcement mat can also be advantageously made from glass fiber or carbon fiber. This composite configuration of the cover facilitates cost effective manufacture.

The encasement compound according to an advantageous embodiment has a flat surface that is processed after curing, wherein the flat surface is oriented towards the back iron device. This way the processed flat surface is configured as a support surface through which the runner is supported for example with an air bearing on the back iron device.

Thus, the runner is advantageously air supported relative to the stator and/or relative to the back iron device.

In an advantageous embodiment the gas outlet nozzles are formed by micro holes.

It is also advantageous when the micro holes forming the gas outlet nozzles are configured in the cover of the housing of the runner.

The object of the invention is achieved through a method for producing a gas supported runner of a linear motor according to the invention according to patent claim 11, with the following steps:

a) providing a housing element including a tub shaped recess and a circumferential wall;

b) attaching the permanent magnets in the tub shaped recess so that adjacent permanent magnets are offset from one another so that they define a first intermediary space between one another which forms a channel;

c) applying the cover to the housing element and to the permanent magnets;

d) drilling micro holes forming gas outlet nozzles through the cover at locations where the first intermediary spaces are arranged below the cover.

This cover can be made completely from plastic material or from a fiber composite material (for example glass fiber composite material or carbon fiber composite material) and can be applied to the housing element as a prefabricated cover element in which the micro holes are drilled according to feature d) after the cover element is applied to the housing element.

This fabrication method facilitates providing a particularly compact gas supported runner which has the advantages described supra. Drilling the micro holes forming the gas outlet nozzles through the cover at locations where the intermediary spaces are arranged below the cover already achieves the desired object so that the bearing support forces which are imparted by the gas exiting from the gas outlet nozzles act directly between two adjacent permanent magnets along opposite edges so that the magnet forces are supported directly adjacent to the respective magnet without the force flow having the cover large distances through the housing element. Thus, the housing element can be configured very light and can be produced for example from a carbon fiber composite material.

Alternatively the cover can also be laminated directly onto the housing element as stated in patent claim 12.

Advantageously step c) of the method according to the invention, this means the step of applying a cover, is performed in the following partial steps:

c1) applying adhesive to a free surface of the permanent magnets that is oriented away from a base of the tub shaped recess and applying the adhesive to a face of the circumferential wall;

c2) positioning the open pore reinforcement mat on the face of the circumferential wall and on the permanent magnets and fixating the reinforcement mat at the circumferential wall and at the permanent magnets through the adhesive;

c3) applying the encasement compound to the open pore reinforcement mat, wherein a viscosity of the encasement compound, its curing time, a porosity of the reinforcement mat, and a thickness of the reinforcement mat are matched so that the encasement compound drenches the reinforcement mat but does not run through the reinforcement mat into the intermediary spaces.

c4) curing the encasement compound; and c5) processing an outer surface of the cover unit including the encasement compound and the reinforcement mat, advantageously milling, grinding and polishing the surface in order to obtain a flat bearing surface for the gas bearing.

This applying of an integral unit including the encasement compound and open pore reinforcement mat configured as a cover onto the housing tub provided with the permanent magnets can be performed quickly and simply, wherein the cured encasement compound can be surface treated in a particularly effective manner after curing in order to obtain a smooth and flat bearing surface for the gas bearing. The initial application of the reinforcement mat onto the faces of the circumferential wall and on the permanent magnet with an adhesive fixates the reinforcement mat not only for the subsequent method step of applying the encasement compound but also provides a particularly firm adhesion of the composite cover including encasement compound and reinforcement mat produced after curing the encasement compound. When pressurized gas is introduced into the channel structure in an interior of the runner housing the adhesion of the reinforcement mat to the circumferential wall of the housing tub provides a ceiling of the reinforcement mat drenched with the encasement compound when the firm cover has been generated through the curing process. Furthermore the adhesion of the reinforcement mat on the individual permanent magnets prevents the cover that is subsequently generated from the encasement compound and the reinforcement mat from being deformed under the gas pressure prevailing in the channels in an interior of the housing.

Therefore the cover does not buckle under the gas pressure so that the bearing surface that forms the outer surface of the cover remains flat and smooth even when the pressurized gas is applied to the channel structure in an interior of the housing of the runner.

Thus it is particularly advantageous when the adhesive for initially fixating the reinforcement mat is the same material as the encasement compound so that the encasement compound used as adhesive penetrates open pores of the reinforcement mat from an inside of the housing and when applying the encasement compound from an outside to the open pore reinforcement mat so that the encasement compound penetrating from the outside into the pores of the reinforcement mat unites with the encasement compound used as adhesive and cures as a unit to form a monolithic block and thus encloses the respective portion of the reinforcement mat within the encasement compound.

It is also particularly advantageous when the permanent magnets are arranged in step b) in the tub shaped recess so that they are offset from the circumferential wall of the housing element so that a circumferential channel is formed in this second intermediary space between the permanent magnets and the circumferential wall, wherein the circumferential channel is in fluid connection with the channels between the permanent magnets and leads into a pressurized gas supply. This way a quick and even distribution of the pressurized gas in the interior of the housing element is achieved into the individual channels between the permanent magnets so that a particularly even support force is achieved by the pressurized fluid exiting from the gas outlet nozzle.

In this embodiment it is particularly advantageous when additional micro holes forming gas outlet nozzles are also drilled in step d) into the cover at locations where the circumferential channel is arranged below the cover. Thus, support forces are not only applied between the individual permanent magnets onto the opposite second bearing surface but also along the circumference of the entire permanent magnet arrangement so that an even smoother bearing support force distribution is achieved over the entire bearing surface.

A particular advantage is achieved when drilling the micro holes forming the gas outlet nozzles is performed with a high energy beam, advantageously with a laser beam. Through this method micro holes with particularly small diameters can be introduced into the bearing surface which provides a high load bearing capability and stiffness for the bearing with minimum pressurized gas consumption in the bearing.

The manufacturing method according to the invention can be performed quickly and in a cost effective manner with high volumes. The open pore reinforcement mat thus forms a reinforcement structure onto which the encasement compound is cast and distributed. The porosity of the reinforcement mat, this means the size and number of the openings and channels provided in the surface and in the thickness structure of the reinforcement mat and the viscosity of the encasement compound adapted to the porosity of the reinforcement mat provide that the encasement compound distributed on the reinforcement mat penetrates the pores and cavities of the reinforcement mat but does not flow through them into the recess of the housing element, thus into the cavities or intermediary spaces provided therein so that the channels formed by them are closed. After curing the encasement compound an external surface of the cover is surface treated with conventional tools, for example milled ground and polished so that a smooth bearing surface is provided. Subsequently micro holes are introduced into the bearing surface which penetrate the cover and on the one hand side open into the bearing surface and on the other hand side open into the cavities and intermediary spaces of the housing element arranged under the cover, thus into the channels of the pressurized gas supply.

BRIEF DESCRIPTION OF THE DRAWINGS

The invention is subsequently described in more detail based on an embodiment with reference to the drawing figure, wherein.

DETAILED DESCRIPTION OF THE INVENTION

Figure 1:
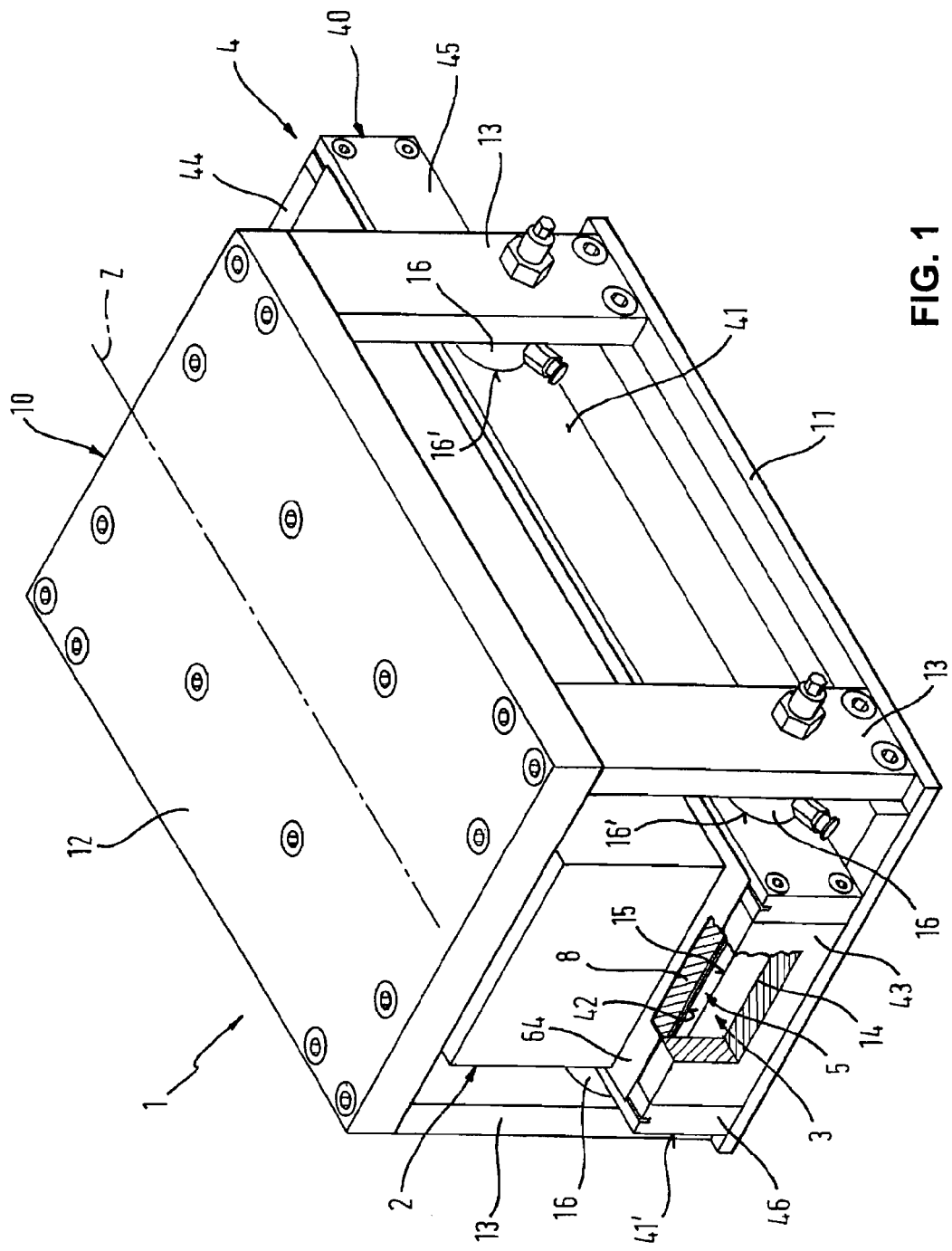
FIG. 1 illustrates perspective view of a linear motor according to the invention.

FIG. 1 illustrates an embodiment of a short stroke linear motor according to the invention. The linear motor 1 includes an outer frame 10 including a base plate 11 and a cover plate 12 which are connected with one another through four corner posts 13. The frame 10 thus takes the shape of a yoke which reaches over the actual functional elements of the linear motor. A stator 2 is applied to the back side of the cover plate 12 wherein the stator is fixated at the cover plate and only illustrated in FIG. 1 schematically as a block. The stator is provided with a coil arrangement which includes a plurality of coils arranged one after another in a direction of the Z-axis and not illustrated. The configuration of a stator of a linear motor is generally known and therefore not described in more detail.

An iron block 14 is centrally arranged extending along the longitudinal axis Z on the base plate 11 of the frame 10 and fixated at the base plate 11. This iron block 14 forms a back iron device 3 for the magnetic field of the permanent magnets of the runner 4 of the linear motor described infra. The surface 15 of the iron block 14 that is oriented away from a base plate forms a flat and smooth bearing surface for a gas bearing for a runner 4 that is described infra.

The runner 4 is arranged between the stator 2 and the back iron device 3 and axially moveable relative to the housing 10, thus relative to the stator 2 and the back iron device 3 along the longitudinal axis Z. An air bearing 16 is respectively provided at an inside of the respective corner supports 13 of the frame 10 wherein a bearing surface 16' of the air bearing cooperates with a lateral support surface 41, 41' of a frame 40 of the runner 4 in order to support and guide the runner 4 in a lateral direction.

In a vertical direction the runner is supported by a gas pressure bearing 5 which is configured as an air bearing between a support surface 15, configured on a top side of the iron block 14 and a support surface 42 of the runner 4.

The configuration of the runner is subsequently described in more detail with reference to FIGS. 2-5.

Figure 2:
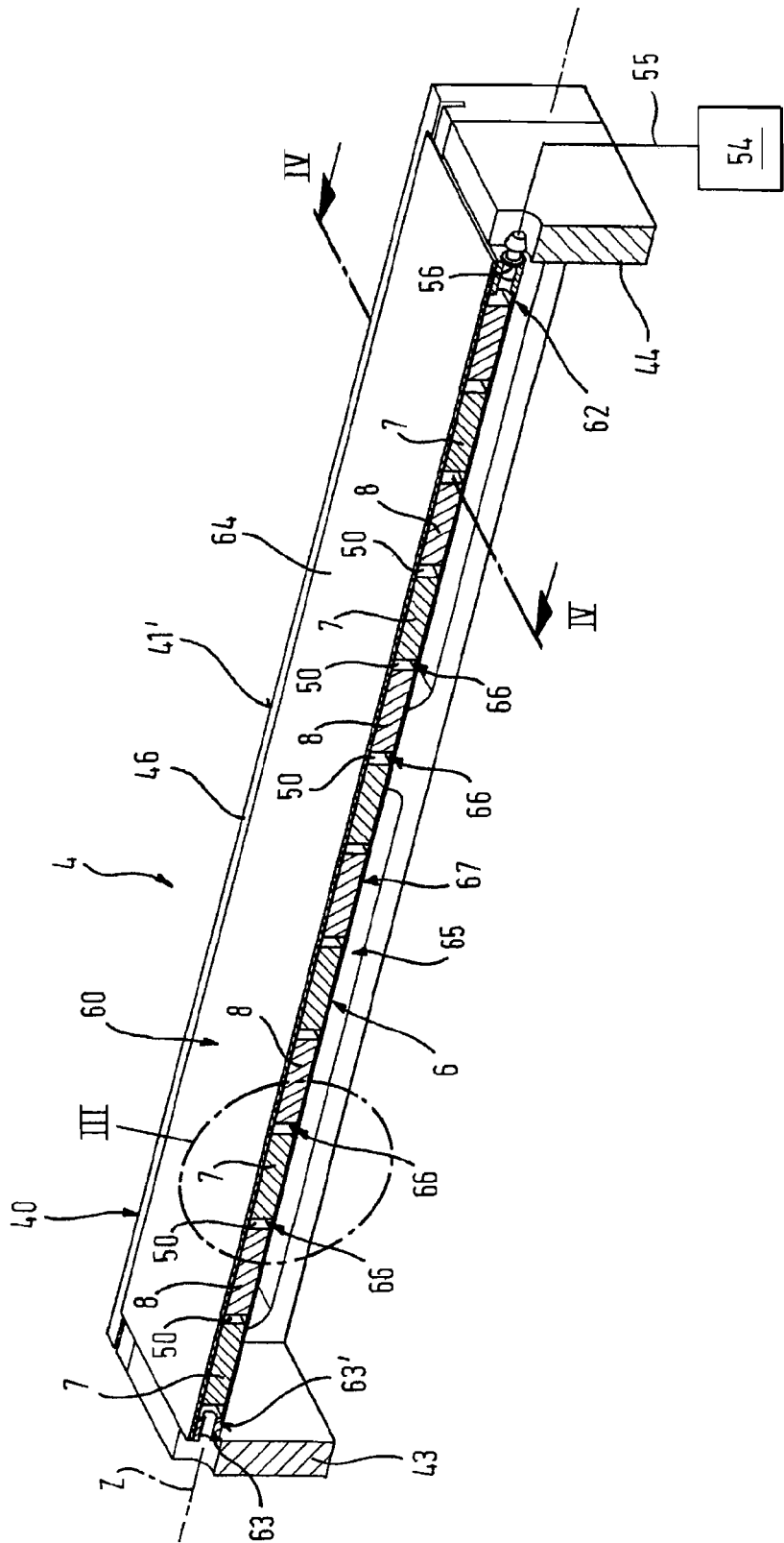
FIG. 2 illustrates a partial sectional perspective view of a runner of the linear motor according to the invention.

FIG. 2 illustrates the runner 4 in a vertical sectional view along the longitudinal axis Z in a perspective view. The frame 40 of the runner 4 includes a first face plate 43, a second face plate 44 and a first longitudinal side wall 45 at whose outside the lateral bearing surface 41 is provided and a second longitudinal side wall 46 at whose outer side wall the lateral bearing surface 41' is configured (FIG. 1). The frame 40 receives a housing 60 for the magnet arrangement.

The frame 40 and the housing 60 form a support structure 6 for the permanent magnets 7, 8. The housing 60 includes a tub shaped housing element 62 with a circumferential wall 63 and a base 64. This way the tub shaped housing element 62 is formed whose tub shaped recess is oriented downward into a direction of the back iron device 3.

In the tub shaped recess 65 a plurality of permanent magnets 7, 8 is arranged along the longitudinal Z and firmly connected with the base plate of the tub shaped housing element 60 for example glued together. Thus, the permanent magnets 7, 8 are arranged so that their magnetic polarity is respectively oriented in alternating directions which is typical for permanent magnet arrangements of linear motors.

A respective first intermediary space 66 is provided between two adjacent magnets 7, 8 so that the adjacent magnets do not contact one another directly. These intermediary spaces 66 form transversally extending inner channels 50 and are used as described infra for distributing pressurized gas in an interior of the housing 60. The magnets 7, 8 are furthermore arranged so that their respective lateral edge is offset from the circumferential wall 63 of the housing 60. Thus, a circumferential channel 52 is formed in a second intermediary space 66' between the permanent magnets 7, 8 and the circumferential wall 63, wherein the circumferential channel is in fluid connection with the transversally (and optionally longitudinally) extending channels 50.

Figure 3:
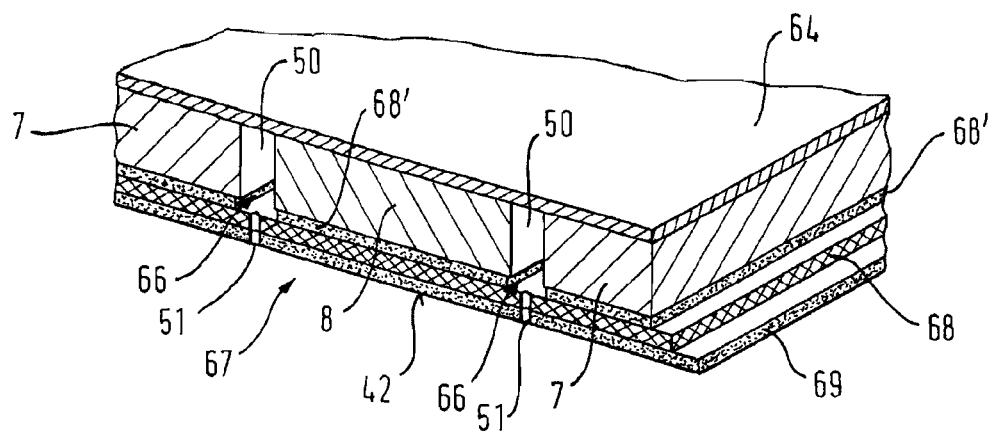
FIG. 3 illustrates an enlarged detail according to the detail III in FIG. 2.
Figure 4:
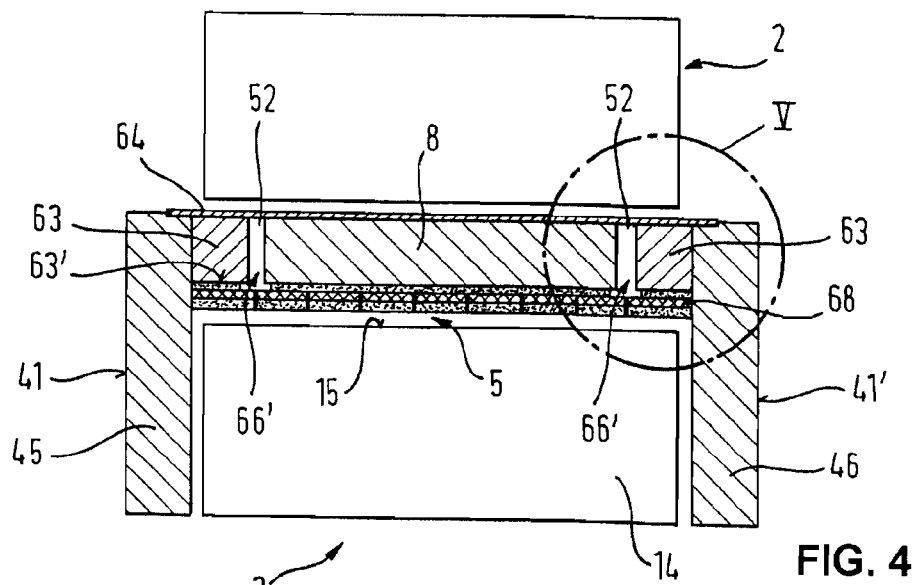
FIG. 4 illustrates a cross sectional view of the runner of FIG. 2 in the plane IV.
Figure 5:
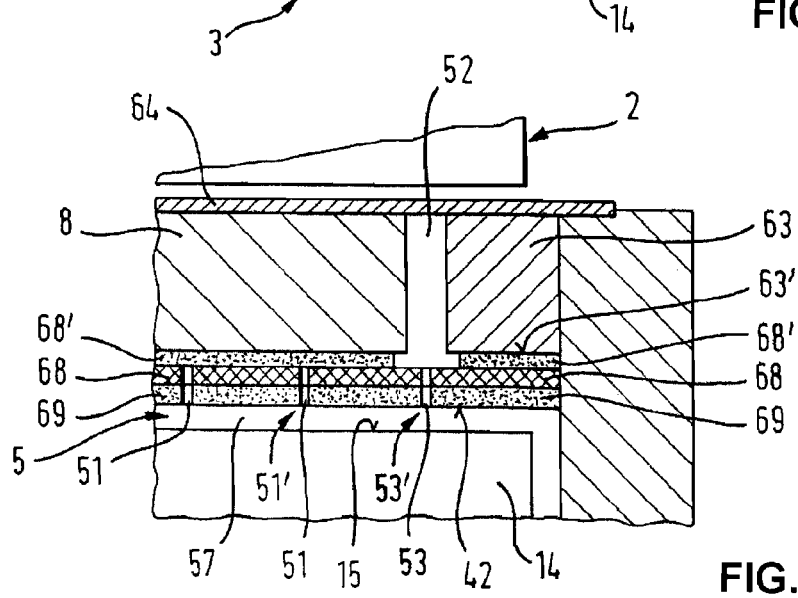
FIG. 5 illustrates an enlarged view of the enlarged detail V in FIG. 4.

The housing 60 is closed with a cover 67 at its bottom side oriented towards the back iron device 3, wherein the cover is at least partially fabricated in composite construction according to the method according to the present invention and its configuration is described in more detail infra in combination with FIGS. 3 to 5.

The cover 67 includes a plurality of micro holes 51, 53 which penetrate the cover 67 and which on the one hand side lead into one of the inner transversally extending channels 50 or into the circumferential channel 52 (FIG. 4) and on the other hand side into the bearing surface 42 of the runner 4 formed by the surface of the cover 67 that is oriented downward in FIG. 2.

The configuration of the cover 67 and its manufacturing method are subsequently described with reference to FIGS. 3-5. In order to fabricate the cover 67 the housing element 60 is inverted relative to the illustration in FIGS. 3-5 so that the base plate 64 is oriented downward.

The cover 67 includes an open pore reinforcement mat 68 which is initially glued on a large surface with an adhesive 68', for example a synthetic resin with the permanent magnets 7, 8 and the face 63' of the circumferential wall 63 that is oriented downward in FIGS. 3-5.

After the open pore reinforcement mat 68 has been glued with the adhesive 68' an encasement compound 69 is applied to the reinforcement mat before the adhesive 68' cures wherein the encasement compound is advantageously made from a synthetic resin that is identical with the synthetic resin of the adhesive 68' or a synthetic resin which enters into a permanent connection after curing.

The encasement compound 69 applied to the open pore reinforcement mat 68 penetrates the open pores of the reinforcement mat 68 without flowing through the reinforcement mat 68. The encasement compound 69 that has penetrated the reinforcement mat 69 connects in an interior of the reinforcement mat with the adhesive 68' that has penetrated from the other side since both are made from the same synthetic resin or from a synthetic resins that connect well with one another. The encasement compound 69 and the adhesive 68' thus enter a monolithic connection after curing within an outside of the open pore reinforcement mat 68 and enclose the reinforcement mat between each other. A respective amount of encasement compound 69 is applied to the reinforcement mat 68 so that the reinforcement mat 68 is not only completely covered by the encasement compound 69 but also so that an overhang of the encasement compound 69 remains. The uneven outer surface of the encasement compound 69 that is produced after curing the encasement compound 69 is subsequently processed through milling, grinding and polishing, so that the surface is flat and evenly smooth. The processed surface then forms the bearing surface 42 for the runner 4.

After this mechanical processing step for the surface 42 the micro holes 51 are drilled through a high energy beam into the unit of encasement compound 69 and reinforcement mat 68 forming the cover 67 at locations of the cover 67 which are arranged above the transversally extending channels 50 for a housing that is inverted relative to the illustration in FIG. 3 and which are arranged below the transversally extending channels in FIGS. 3-5. The micro holes 51 penetrate the cover and thus lead on the one hand side into the respective channel 50 and on the other hand side in outward direction into the bearing surface 42. Drilling through the cover 67 is furthermore performed at locations above (or in FIG. 3-5 below) the circumferential channel 52 enveloping the permanent magnets 7, 8 while forming additional micro holes 53.

The micro holes 51, 53 form gas outlet nozzles 51', 53' for a pressurized gas for example compressed air at their outlets into the bearing surface 42 wherein the compressed gas is introduced by a compressed gas supply device 54 that is only schematically illustrated in FIG. 2 through the also only schematically illustrated pressurized gas conduit 55 and a compressed gas connection 56 penetrating the circumferential wall 63 of the housing into the channel system of the channels 50, 52 in an interior of the housing 60. The pressurized gas passes through the micro holes 51, 53 through the cover 67 and exits at the gas outlet nozzles 51', 53 and enters the bearing gap 57 of the gas bearing 5 that is formed between the bearing surface 42 of the runner 4 and the bearing surface 15 of the back iron device 3. The pressurized gas forms a gas cushion at this location for the bearing. It is certainly feasible to use other pressurized gasses beside compressed air for the bearing.

The invention is not limited to the embodiment recited supra which is only used to generally line out the core idea of the invention. Within the scope of the invention the device according to the invention can also be configured as an embodiment that differs from the one described supra. The device can thus have in particular features which are a combination of individual features of the patent claims.

Reference numerals in the claims, the description and the drawings are only used for better understanding the invention and do not limit the scope of patent protection which is only defined by the appended patent claims.

What is claimed is:

1. A linear motor, comprising:
   a stator including electrical coils;
   a runner including permanent magnets; and
   a back iron device,
   wherein the runner is arranged between the stator and the back iron device and offset from the stator and the back iron device,
   wherein the runner is moveable relative to the stator and the back iron device;
   wherein the permanent magnets are arranged in a section of the runner which section is provided between the stator and the back iron device,
   wherein the runner is gas supported relative to the stator or relative to the back iron device through a gas pressure bearing,
   wherein the runner is provided with a plurality of inner channels which are in fluid connection with a pressurized gas supply device and wherein a plurality of gas outlet nozzles is in fluid connection with an interior of the channels,
   wherein the gas pressure bearing includes at least a first bearing surface provided at the runner and a second bearing surface provided at the stator or at the back iron device,
   wherein the first bearing surface provided at the runner includes the plurality of gas outlet nozzles,
   wherein respective adjacent permanent magnets of the runner are offset from one another and wherein a first intermediary space formed between two adjacent permanent magnets forms a channel into which the gas outlet nozzles lead.

2. The linear motor according to claim 1, wherein the runner includes a support structure in which or at which the permanent magnets are arranged.

3. The linear motor according to claim 2, wherein the support structure includes a closed housing in whose interior the permanent magnets are arranged.

4. The linear motor according to claim 3, wherein the housing is formed by a tub shaped housing element which is closed at an open side by a cover.

5. The linear motor according to claim 4, wherein the permanent magnets are provided in a base of the tub shaped housing element.

6. The linear motor according to claim 4,
   wherein the cover is made from an encasement compound provided with a open pore reinforcement mat,
   wherein the reinforcement mat is a flat contexture provided as a fleece or a woven material or a knitted material.

7. The linear motor according to claim 6, wherein the encasement compound has a flat surface that is processed after curing and oriented towards the back iron device.

8. The linear motor according to claim 1, wherein the runner is air supported relative to the stator or relative to the back iron device.

9. The linear motor according to claim 1, wherein the gas outlet nozzles are formed by micro holes.

10. The linear motor according to claim 1, wherein the micro holes forming the gas outlet nozzles are formed in the cover of the housing of the runner.

11. A method for producing the gas supported runner of the linear motor according to claim 1, comprising the steps:
    a) providing the housing element including a tub shaped recess and a circumferential wall;
    b) attaching the permanent magnets in the tub shaped recess so that the respective adjacent permanent magnets are offset from one another so that they define the first intermediary space between one another which forms a channel;
    c) applying a cover to the housing element and to the permanent magnets;
    d) drilling micro holes forming the gas outlet nozzles through the cover at locations where the first intermediary spaces are arranged below the cover.

12. The method according to claim 11, wherein step c) of applying the cover is performed with the partial steps:
    c1) applying an adhesive to a free surface of the permanent magnets that is oriented away from the base of the tub shaped recess and applying the adhesive to a face of the circumferential wall;

c2) positioning an open pore reinforcement mat on the face of the circumferential wall and on the permanent magnets and fixating the reinforcement mat at the circumferential wall and at the permanent magnets through the adhesive;

c3) applying an encasement compound to the open pore reinforcement mat, wherein a viscosity of the encasement compound, its curing time, a porosity of the reinforcement mat and a thickness of the reinforcement mat are matched so that the encasement compound drenches the reinforcement mat, but does not run through the reinforcement mat into the intermediary spaces;

c4) curing the encasement compound; and c5) processing an outer surface of the unit forming the cover and including the encasement compound and the reinforcement mat through milling or grinding or polishing the outer surface to make the first bearing surface flat for the gas pressure bearing.

13. The method according to claim 11,
wherein the permanent magnets are applied in step b) in the tub shaped recess so that they are offset from the circumferential wall of the housing element so that a circumferential channel is formed in a second intermediary space between the permanent magnets and the circumferential wall,
wherein the circumferential channel is in fluid connection with the channels between the permanent magnets and a pressurized gas supply leads into the circumferential channel.

14. The method according to claim 13, wherein step d) includes drilling additional micro holes into the cover forming gas outlet nozzles at locations where the circumferential channel is arranged below the cover.

15. The method according to claim 11, wherein drilling the micro holes forming the gas outlet nozzles is performed by a high energy beam.

16. A linear motor, comprising:
a stator including electrical coils;
a runner including permanent magnets; and
a back iron device,
wherein the runner is arranged between the stator and the back iron device and offset from the stator and the back iron device,
wherein the runner is moveable relative to the stator and the back iron device;
wherein the permanent magnets are arranged in a section of the runner which section is provided between the stator and the back iron device,
wherein the runner is gas supported relative to the stator and relative to the back iron device through a gas pressure bearing,
wherein the runner is provided with a plurality of inner channels which are in fluid connection with a pressurized gas supply device and wherein a plurality of gas outlet nozzles is in fluid connection with an interior of the channels,
wherein the gas pressure bearing includes at least a first bearing surface provided at the runner and a second bearing surface provided at the stator and at the back iron device,
wherein the first bearing surface provided at the runner includes the plurality of gas outlet nozzles,
wherein respective adjacent permanent magnets of the runner are offset from one another and wherein a first intermediary space formed between two adjacent permanent magnets forms a channel into which the gas outlet nozzles lead.

17. The linear motor according to claim 16, wherein the runner is air supported relative to the stator and relative to the back iron device.

18. The method according to claim 15, wherein the high energy beam is a laser beam.

* * * * *